United States Patent
Cariou et al.

(10) Patent No.: US 10,721,761 B2
(45) Date of Patent: Jul. 21, 2020

(54) CENTRALIZED CHANNEL ACCESS FOR PRIMARY AND SECONDARY CHANNELS IN A WIRELESS LOCAL-AREA NETWORK

(71) Applicant: Intel IP Corporation, Santa Clara, CA (US)

(72) Inventors: Laurent Cariou, Portland, OR (US); Carlos Cordeiro, Portland, OR (US); Chittabrata Ghosh, Fremont, CA (US); Assaf Kasher, Haifa (IL); Solomon B. Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 9 days.

(21) Appl. No.: 16/239,202

(22) Filed: Jan. 3, 2019

(65) Prior Publication Data

US 2019/0159239 A1    May 23, 2019

Related U.S. Application Data

(63) Continuation of application No. 14/975,225, filed on Dec. 18, 2015, now abandoned.
(Continued)

(51) Int. Cl.
*H04W 72/04* (2009.01)
*H04W 72/12* (2009.01)
(Continued)

(52) U.S. Cl.
CPC ..... *H04W 72/1289* (2013.01); *H04W 72/042* (2013.01); *H04W 72/048* (2013.01);
(Continued)

(58) Field of Classification Search
CPC ......... H04W 72/1289; H04W 74/0891; H04W 72/0453; H04W 72/0446; H04W 72/048; H04W 72/042; H04W 74/04
See application file for complete search history.

(56) References Cited

U.S. PATENT DOCUMENTS

2015/0207602 A1    7/2015  Yang et al.
2016/0198345 A1    7/2016  Fan et al.
(Continued)

OTHER PUBLICATIONS

U.S. Appl. No. 14/975,225, filed Dec. 18, 2015, Centralized Channel Access for Primary and Secondary Channels in a Wireless Local-Area Network.
(Continued)

*Primary Examiner* — Moo Jeong
(74) *Attorney, Agent, or Firm* — Schwegman Lundberg & Woessner, P.A.

(57) ABSTRACT

Computer readable media, methods, and apparatuses for centralized channel access for primary and secondary channels are disclosed. An apparatus is disclosed comprising memory and processing circuitry. The processing circuitry is configured to encode a schedule of one or more resource allocations, wherein each resource allocation comprises a type of allocation, a bandwidth, an indication of a channel, a source association identification (AID), a destination AID, an allocation start, and a duration. The type of allocation may be a service period (SP) or a contention-based access period (CBAP). The channel may be an indication of a basic service set (BSS) or a personal BSS (PBSS) primary channel, BSS or PBSS secondary channel, or BSS or PBSS tertiary channel. The processing circuitry may be configured to transmit the schedule to one or more stations identified by the source AID and the destination AID of the one or more resource allocations.

22 Claims, 6 Drawing Sheets

| | 402 | 404 | 406 | 408 | 410 | 412 | 414 | 416 |
|---|---|---|---|---|---|---|---|---|
| | ALLOCATION CONTROL | BF CONTROL | SOURCE AID | DESTINATION AID | ALLOCATION START | ALLOCATION BLOCK DURATION | NUMBER OF BLOCKS | ALLOCATION BLOCK PERIOD |
| OCTETS | 2 | 2 | 1 | 1 | 4 | 2 | 1 | 2 |

308

402

Related U.S. Application Data (60) Provisional application No. 62/196,057, filed on Jul. 23, 2015.

(51) Int. Cl.
*H04W 74/04* (2009.01)
*H04W 74/08* (2009.01)

(52) U.S. Cl.
CPC ... *H04W 72/0446* (2013.01); *H04W 72/0453* (2013.01); *H04W 74/04* (2013.01); *H04W 74/0891* (2013.01)

(56) References Cited

U.S. PATENT DOCUMENTS

| | | |
|---|---|---|
| 2016/0302206 A1 | 10/2016 | Xing et al. |
| 2016/0316375 A1 | 10/2016 | Li |
| 2016/0316455 A1 | 10/2016 | Asterjadhi et al. |
| 2016/0329986 A1 | 11/2016 | Eitan |
| 2017/0026981 A1 | 1/2017 | Cariou et al. |

OTHER PUBLICATIONS

IEEE Std 802.11ad™—2012 (Amendment to IEEE Std 802.11™—2012, as amended by IEEE Std 802.11ae™—2012 and IEEE Std 802.11aa™—2012), IEEE, (Dec. 28, 2012), 25 pgs.

"U.S. Appl. No. 14/975,225, Advisory Action dated Jan. 29, 2018", 4 pgs.
"U.S. Appl. No. 14/975,225, Advisory Action dated Mar. 22, 2018", 3 pgs.
"U.S. Appl. No. 14/975,225, Examiner Interview Summary dated Jan. 11, 2018", 3 pgs.
"U.S. Appl. No. 14/975,225, Examiner Interview Summary dated Jul. 25, 2018", 3 pgs.
"U.S. Appl. No. 14/975,225, Examiner Interview Summary dated Oct. 11, 2017", 3 pgs.
"U.S. Appl. No. 14/975,225, Examiner-Initiated Interview Summary dated Oct. 4, 2018", 2 pgs.
"U.S. Appl. No. 14/975,225, Final Office Action dated Nov. 16, 2017", 37 pgs.
"U.S. Appl. No. 14/975,225, Non Final Office Action dated Apr. 6, 2018", 42 pgs.
"U.S. Appl. No. 14/975,225, Non Final Office Action dated Jun. 29, 2017", 25 pgs.
"U.S. Appl. No. 14/975,225, Notice of Allowance dated Oct. 4, 2018", 17 pgs.
"U.S. Appl. No. 14/975,225, Response filed Aug. 27, 2018 to Non Final Office Action dated Apr. 6, 2018", 11 pgs.
"U.S. Appl. No. 14/975,225, Response filed Sep. 29, 2017 to Non Final Office Action dated Jun. 29, 2017", 12 pgs.
"U.S. Appl. No. 14/975,225, Response filed Feb. 16, 2018 to Advisory Action dated Jan. 29, 2018", 14 pgs.
"U.S. Appl. No. 14/9975,225, Response filed Jan. 16, 2018 to Final Office Action dated Nov. 16, 2017", 14 pgs.

| | ALLOCATION ID | ALLOCATION TYPE | PSEUDO-STATIC | TRUNC-ATABLE | EXTENDABLE | PCP ACTIVE | LP SC USED | NEW PRIMARY |
|---|---|---|---|---|---|---|---|---|
| | 504 | 506 | 508 | 510 | 512 | 514 | 516 | 518 |
| | B0 | B3 B4 | B6 | B7 | B8 | B9 | B10 | B11 | B12 B15 |
| BITS 502 | 4 | 3 | 1 | 1 | 1 | 1 | 1 | 3 |

| BIT 4 | BIT 5 | BIT 6 | MEANING |
|---|---|---|---|
| 0 | 0 | 0 | SP ALLOCATION |
| 1 | 0 | 0 | CBAP ALLOCATION |
| ALL OTHER COMBINATIONS | | | RESERVED |

CENTRALIZED CHANNEL ACCESS FOR PRIMARY AND SECONDARY CHANNELS IN A WIRELESS LOCAL-AREA NETWORK

PRIORITY CLAIM

This application is a continuation of U.S. patent application Ser. No. 14/975,225, filed Dec. 18, 2015, which claims the benefit of priority under 35 USC 119(e) to U.S. Provisional Patent Application Ser. No. 62/196,057, filed Jul. 23, 2015, each of which is incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ay. Some embodiments relate to service period (SP) and/or contention-based access period (CBAP) channel resource allocations.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

Thus, there are general needs for improved methods, apparatuses, and computer readable media for centralized channel access for primary and secondary channels.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
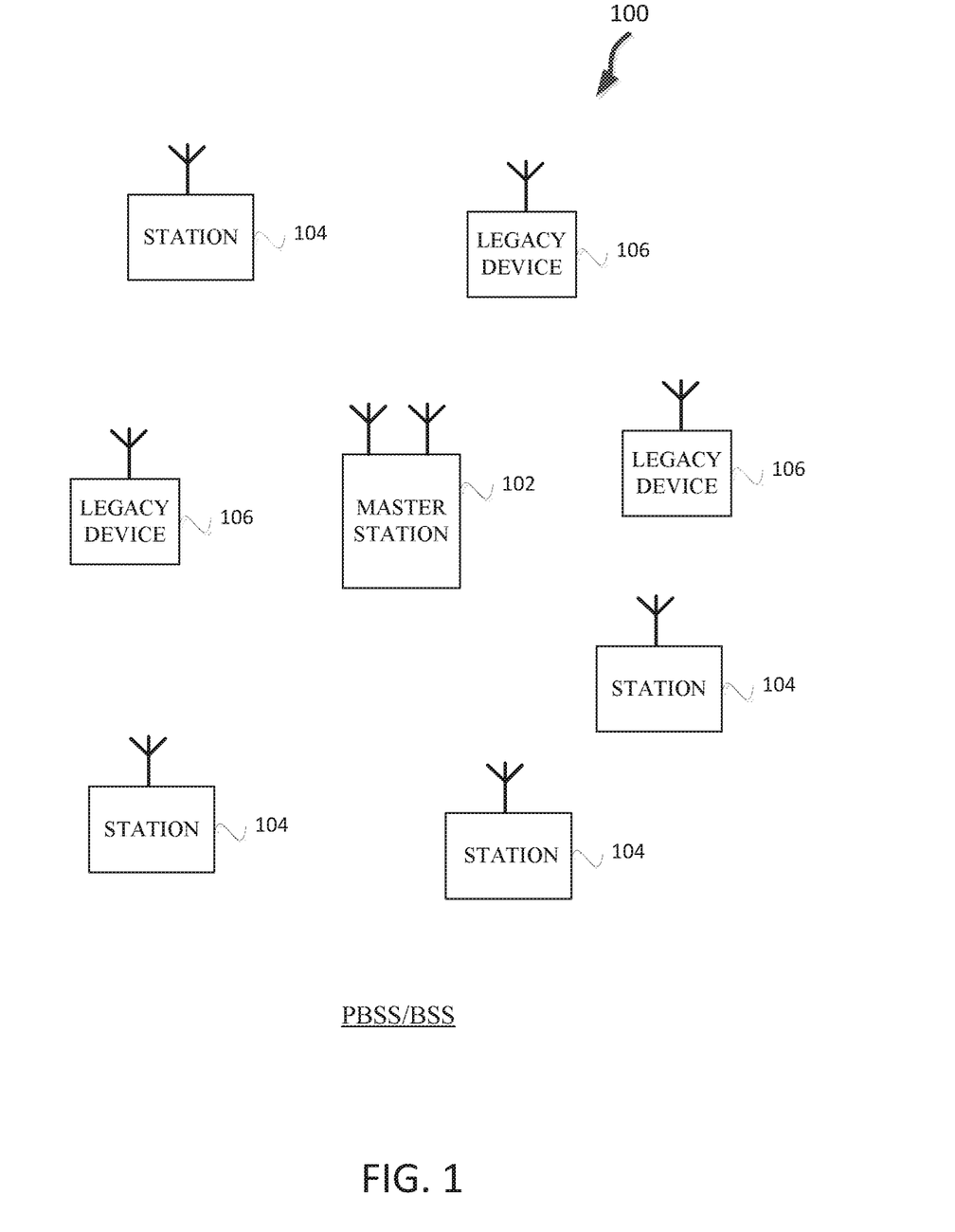
FIG. 1 illustrates a wireless network in accordance with some embodiments.

FIG. 1 illustrates a WLAN 100 in accordance with some embodiments. The WLAN may comprise a basis service set (BSS) or personal BSS (PBSS) 100 that may include a master station 102, which may be an AP or PBSS control point (PCP), a plurality of wireless (e.g., IEEE 802.11ay) STAs 104 and a plurality of legacy (e.g., IEEE 802.11n/ac/ad) devices 106.

The master station 102 may be an AP using the IEEE 802.11 to transmit and receive. The master station 102 may be a base station. The master station 102 may be a PBSS. The master station 102 may use other communications protocols as well as the IEEE 802.11 protocol. The IEEE 802.11 protocol may be IEEE 802.11ay. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA), multiple-input multiple-output (MIMO), multi-user MIMO (MU-MIMO), and/or single-input single-output (SISO). The master station 102 and/or wireless STA 104 may be configured to operate in accordance with NG60, WiGiG, and/or IEEE 802.11ay.

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The wireless STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay or another wireless protocol. In some embodiments, the wireless STAs 104 may operate in accordance with IEEE 802.11ax. The STAs 104 and/or master station 102 may be attached to a BSS and may also operation IEEE 802.11ay where one of the STAs 104 and/or master station 102 takes the role of the PCP.

The master station 102 may communicate with legacy devices 106 in accordance with legacy IEEE 802.11 communication techniques. In example embodiments, the master station 102 may also be configured to communicate with wireless STAs 104 in accordance with legacy IEEE 802.11 communication techniques. The master station 102 may use techniques of 802.11ad for communication with legacy device. The master station 102 may be a personal basic service set (PBSS) Control Point (PCP) which can be equipped with large aperture antenna array or Modular Antenna Array (MAA).

The master station 102 may be equipped with more than one antenna. Each of the antennas of master station 102 may be a phased array antenna with many elements. In some embodiments, an IEEE 802.11ay frame may be configurable to have the same bandwidth as a channel. The frame may be configured to operate over 1-4 2160 MHz channels. The channels may be contiguous.

An 802.11ay frame may be configured for transmitting a number of spatial streams, which may be in accordance with MU-MIMO. In other embodiments, the master station 102, wireless STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to 802.11ay communications. In accordance with some IEEE 802.11ay embodiments, a master station 102 may operate as a master station which may be arranged to contend for a wireless medium (e.g., during a contention period) to receive exclusive control of the medium for performing enhanced beamforming training for a multiple access technique such as OFDMA or MU-MIMO. In some embodiments, the multiple-access technique used during the TxOP (transmit opportunity) may be a scheduled OFDMA technique, although this is not a requirement. In some embodiments, the multiple access technique may be a space-division multiple access (SDMA) technique.

The master station 102 may also communicate with legacy stations 106 and/or wireless stations 104 in accordance with legacy IEEE 802.11 communication techniques.

In example embodiments, the station 104, which may be a 802.11ay device, and/or the master station 102 are configured to perform the methods and functions herein described in conjunction with FIGS. 1-7.

Figure 2:
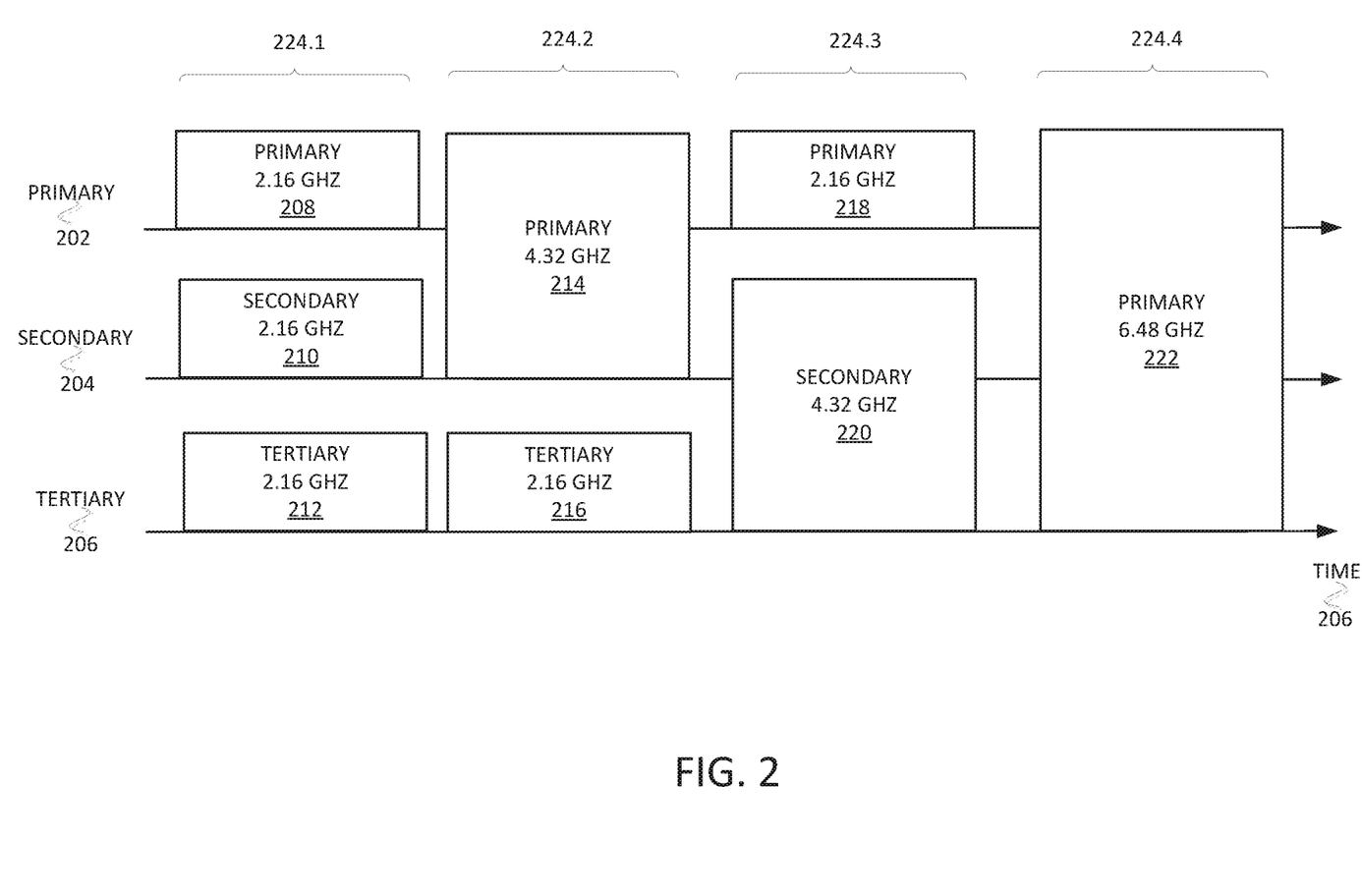
FIG. 2 illustrates different SP and CBAP channel allocations in accordance with some embodiments.

FIG. 2 illustrates different SP and CBAP channel allocations 224 in accordance with some embodiments. Illustrated in FIG. 2 are channel allocations 224, time 206 along a horizontal axis, and frequency with a primary 202 channel, secondary 204 channel, and tertiary 206 channel. A BSS or a PBSS station 104 and/or master station 102 may determine a channel allocation 224 and may transmit the channel allocation 224 to stations 104. Channel allocation 224.1 may comprise a primary 2.16 GHz 208 channel, a secondary 2.16 GHz 210 channel, and a tertiary 2.16 GHz 212 channel. Channel allocation 224.2 may comprise a primary 4.32 GHz 214 channel and a tertiary 2.16 GHz 216 channel.

Channel allocation 224.3 may comprise a primary 2.16 GHz 218 channel and a secondary 4.32 GHz 220 channel. Channel allocation 224.4 may comprise a primary 6.48 GHz 222 channel.

Figure 3:
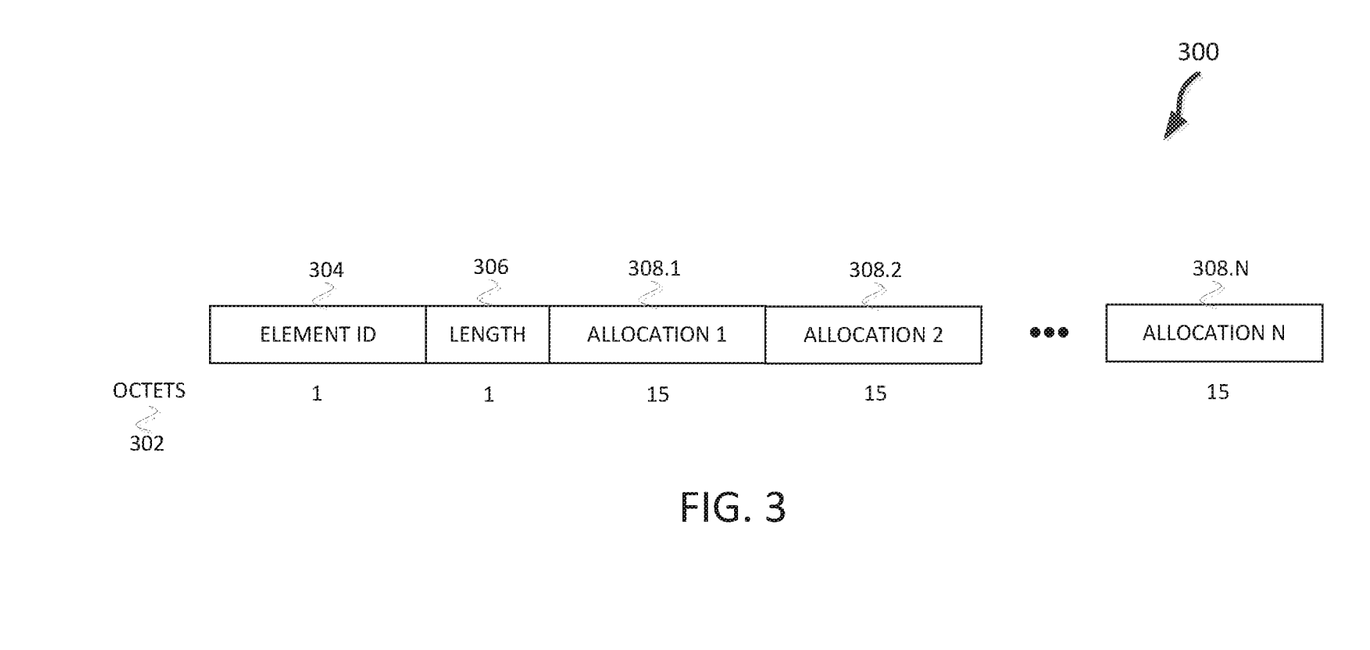
FIG. 3 illustrates a schedule element in accordance with some embodiments.

FIG. 3 illustrates a schedule element 300 in accordance with some embodiments. Illustrated in FIG. 3 is the schedule element 300 comprising element identification (ID) 304, length 306, allocation 1 308.1, allocation 2 308.2, through allocation N 308.N, and octets 302.

The element ID 304 may be one octet 302 and may comprise an identification that identifies the elements as a schedule element 300 or extended schedule element 300. The length 306 may indicate a length or duration of the schedule element 300. The allocations allocation 1 308.1 through allocation 308.n may indicate resource allocations as described in conjunction with FIG. 4.

Figure 4:
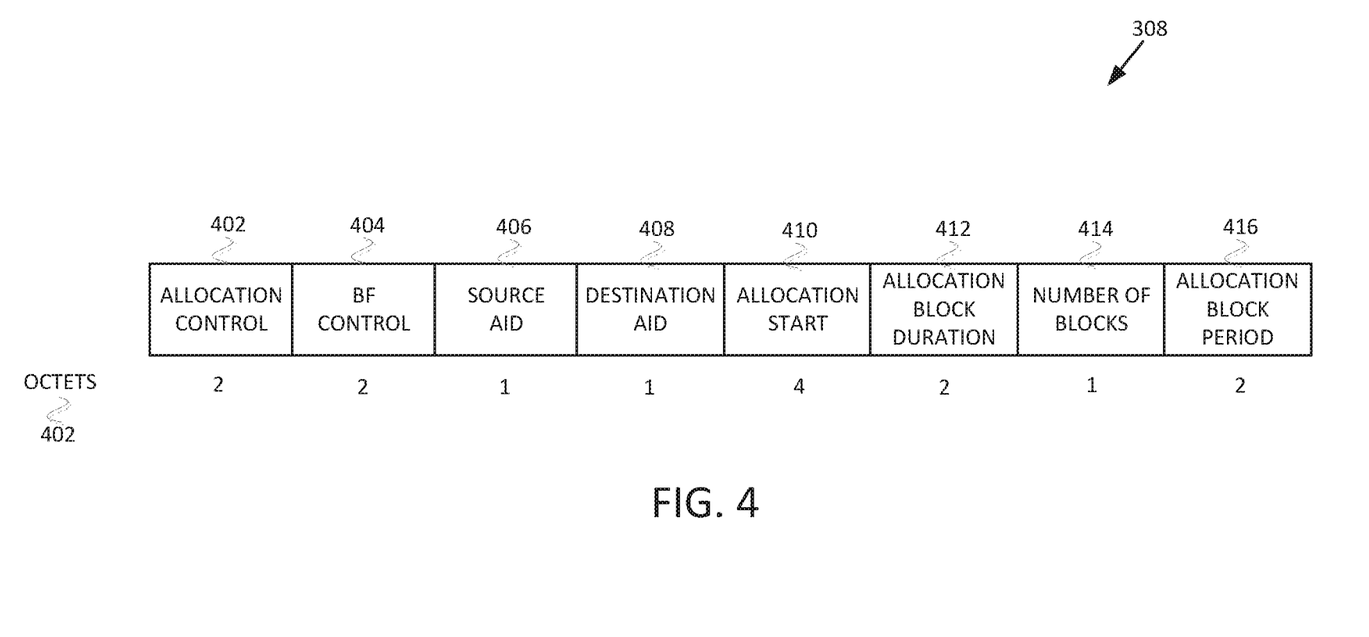
FIG. 4 illustrates an allocation in accordance with some embodiments.

FIG. 4 illustrates an allocation 308 in accordance with some embodiments. Illustrated in FIG. 4 are octets 402 and allocation 308 including allocation control 402, beamforming (BF) control 404, source association identification (AID), destination AID 408, allocation start 410, allocation block duration 412, number of blocks 414, and allocation block period 416.

Figure 5:
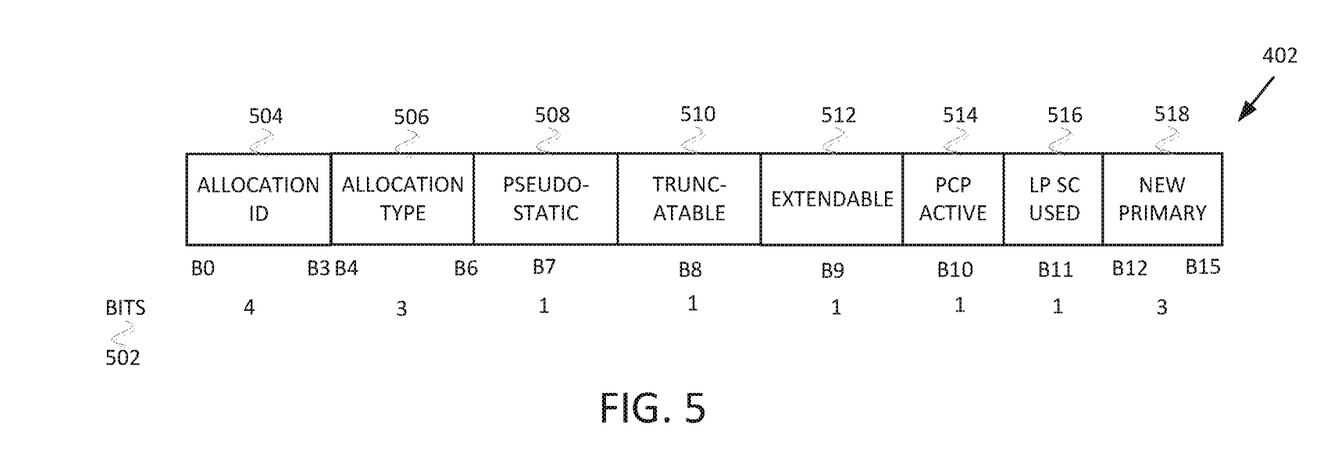
FIG. 5 illustrates the allocation control in accordance with some embodiments.
Figure 6:
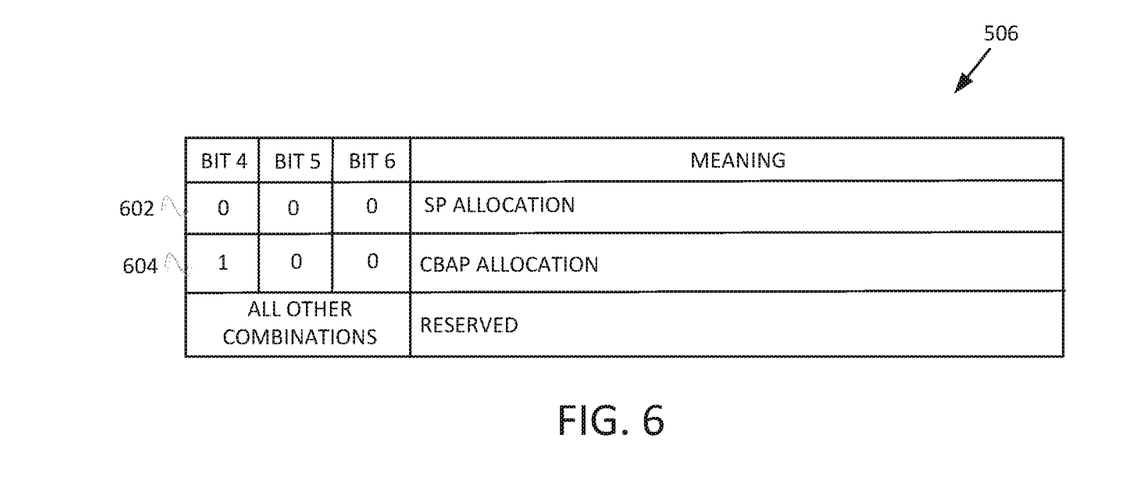
FIG. 6 illustrates the allocation type in accordance with some embodiments.

The allocation control 402 may include the bandwidth of the allocation and the type of allocation as described in conjunction with FIGS. 5 and 6. The BF control 404 may include information regarding BF. The source AID 406 may be the AID 406 of a station 104 that may initially transmit during the allocation 308. The destination AID 408 may be the AID 406 of a station 104 that may initially receive during the allocation 308. The PCP/AP can only be one of the STAs allocated in the secondary channel(s) if it is not scheduled in the primary allocation in accordance with some embodiments. Allocation start 410 may indicate a time when the SP or CRAP allocation starts. Allocation block duration 412 may indicate a duration in microseconds of a contiguous time block for which the SP or CRAP allocation 308 is made. The duration of the allocation 408 may be limited not to exceed the duration of an allocation 308 on the primary channel of the BSS or PBSS.

Number of blocks 414 may be a number of time blocks making up the allocation 308. Allocation block period 416 comprises the time in microseconds between the start of two consecutive time blocks belonging to the same allocation. In some embodiments, the allocation start 410 is the same as a start time for an allocation 308 on a primary channel of the BSS or PBSS.

FIG. 5 illustrates the allocation control 402 in accordance with some embodiments. Illustrated in FIG. 5 are bits 502 and the allocation control 402 including allocation ID 504 field, allocation type 506 field, pseudo-static 508 field, truncatable 510 field, extendable 512 field, PBSS control point (PCP) active 514 field, low power (LP) single carrier (SC) used 516 field, and new primary 518 field. The allocation ID 504 field may be an ID of the allocation that may be used to identify the allocation 308.

The allocation type 506 field may define the type of allocation as described in conjunction with FIG. 6. The pseudo-station 508 field may indicate whether the allocation is pseudo-static or not. The truncatable 510 field indicates whether or not the source station and destination station indicated in the allocation 308 can request SP truncation of the allocation 308 or not. The extendable 512 field indicates whether or not the source station and destination station indicated in the allocation 308 can request extension of the allocation 308.

The PCP active 514 field indicates whether the PCP is available to receive transmissions during the SP or CBAP. The LP SC used 516 field indicates whether LP SC PHY is used or not. The new primary 518 field may define a primary channel of the allocation 308. For example, 0 0 may be BSS/PBSS primary channel, 0 1 may be BSS/PBSS secondary channel, and 1 0 may be BSS/PBSS tertiary channel. For example, for the channel allocation 224.1, 0 0 would indicate primary 2.16 GHz 208. For example, for the channel allocation 224.3, 0 1 may indicate the secondary 4.32 GHz 220. This new primary channel is the primary channel of the allocation and can therefore be different from the primary channel of the PBSS/AP. In some embodiments, the allocation start 410 field of the primary, secondary and tertiary allocations may be aligned or misaligned. In some embodiments, the allocation block duration 412 of the primary, secondary and tertiary allocations may be aligned or misaligned.

FIG. 6 illustrates the allocation type 506 in accordance with some embodiments. Illustrated in FIG. 6 are two bit patterns 602, 604. The first bit pattern 602 indicates a SP allocation and the second bit pattern 604 indicates a CBAP allocation.

Figure 7:
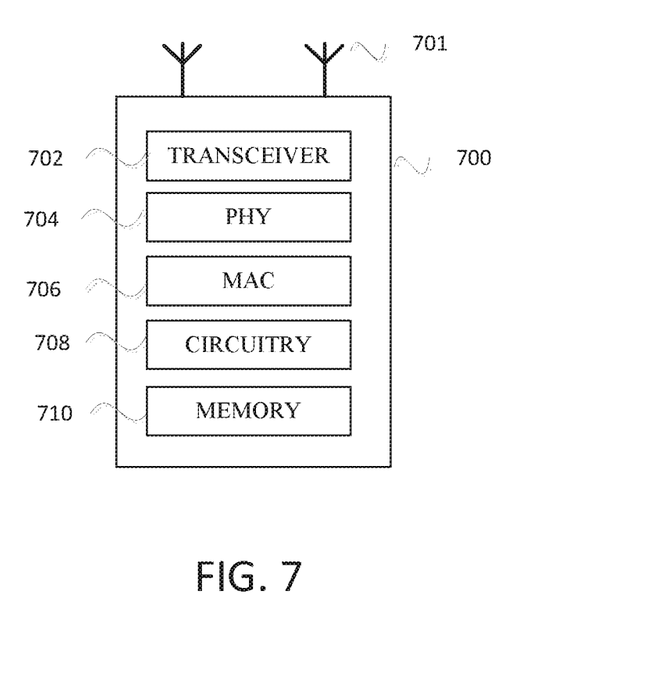
FIG. 7 illustrates a HEW station in accordance with some embodiments.

FIG. 7 illustrates a wireless device in accordance with some embodiments. Wireless device 700 may be an IEEE 802.11ay compliant device that may be arranged to communicate with one or more other IEEE 802.11ay devices, such as STAs 104 (FIG. 1) or master station 102 (FIG. 1) as well as communicate with legacy devices 106 (FIG. 1).

STAs 104 and legacy devices 106 may also be referred to as 802.11ay devices and legacy STAs, respectively. Wireless device 700 may be suitable for operating as master station 102 (FIG. 1) or a STA 104 (FIG. 1). In accordance with embodiments, wireless device 700 may include, among other things, a transmit/receive element 701 (for example an antenna), a transceiver 702, physical (PHY) circuitry 704, and media access control (MAC) circuitry 706. PHY circuitry 704 and MAC circuitry 706 may be an IEEE 802.11ay compliant layers and may also be compliant with one or more legacy IEEE 802.11 standards. MAC circuitry 706 may be arranged to configure packets such as a physical layer convergence procedure (PLCP) protocol data unit (PPDUs) and arranged to transmit and receive PPDUs, among other things. Wireless device 700 may also include circuitry 708 and memory 710 configured to perform the various operations described herein. The circuitry 708 may be coupled to the transceiver 702, which may be coupled to the transmit/receive element 701. While FIG. 7 depicts the circuitry 708 and the transceiver 702 as separate components, the circuitry 708 and the transceiver 702 may be integrated together in an electronic package or chip.

In some embodiments, the MAC circuitry 706 may be arranged to contend for a wireless medium during a beam forming training period. In some embodiments, the MAC circuitry 706 may be arranged to contend for the wireless medium based on channel contention settings, a transmitting power level, and a CCA level.

The PHY circuitry 704 may be arranged to transmit the 802.11ay PPDU. The PHY circuitry 704 may include circuitry for modulation/demodulation, upconversion/downconversion, filtering, amplification, etc. In some embodiments, the circuitry 708 may include one or more processors. The circuitry 708 may be configured to perform functions based on instructions being stored in a RAM or ROM, or based on special purpose circuitry. The circuitry 708 may be termed processing circuitry in accordance with some embodiments. The circuitry 708 may include a processor such as a general purpose processor or special purpose processor. The circuitry 708 may implement one or more functions associated with transmit/receive elements 701, the transceiver 702, the PHY circuitry 704, the MAC circuitry 706, and/or the memory 710.

In some embodiments, the circuitry 708 may be configured to perform one or more of the functions and/or methods described herein and/or in conjunction with FIGS. 1-7 such as identifying spatial reuse opportunities, signaling spatial reuse opportunities, and spatially reusing one or more channels.

In some embodiments, the transmit/receive elements 701 may be two or more antennas that may be coupled to the PHY circuitry 704 and arranged for sending and receiving signals including transmission of the 802.11ay packets. The transceiver 702 may transmit and receive data such as 802.11ay PPDU and packets that include an indication that the wireless device 700 should adapt the channel contention settings according to settings included in the packet. The memory 710 may store information for configuring the other circuitry to perform operations for configuring and transmitting 802.11ay packets and performing the various operations to perform one or more of the functions and/or methods described herein and/or in conjunction with FIGS. 1-7 such as identifying spatial reuse opportunities, signaling spatial reuse opportunities, and spatially reusing one or more channels.

In some embodiments, the wireless device 700 may be configured to communicate using OFDM communication signals over a multicarrier communication channel. In some embodiments, wireless device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the wireless device 700 may use 4× symbol duration of 802.11n or 802.11ac.

In some embodiments, an wireless device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 700 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a wireless device comprising memory and processing circuitry coupled to the memory, the processing circuity configured to: encode a schedule of one or more resource allocations, wherein each resource allocation comprises a type of allocation, a bandwidth, an indication of a channel, a source association identification (AID), a destination AID, an allocation start, and a duration, wherein the type of allocation is one of a service period (SP) or a contention-based access period (CBAP), and wherein the channel is one of an indication of a basic service set (BSS) or a personal BSS (PBSS) primary channel, BSS or PBSS secondary channel, or BSS or PBSS tertiary channel; and configure the device for transmission of the schedule to one or more stations identified by the source AID and the destination AID of the one or more resource allocations.

In Example 2, the subject matter of Example 1 can optionally include where if the one or more allocations is at least two allocations then a first allocation of the one or more allocations comprises the BSS or PBSS primary channel as the channel and a first source AID and a first destination AID wherein a station with the first source AID or the first destination AID is legacy station.

In Example 3, the subject matter of Examples 1 or 2 can optionally include where if the type is the SP and if the one or more allocations comprises at least two allocations, then the stations identified by the source AID and destination AID in different allocations are different from one another.

In Example 4, the subject matter of any of Examples 1-3 can optionally include where the BSS or PBSS primary channel, BSS or PBSS secondary channel and BSS or PBSS tertiary channel are to be defined by a packet transmitted prior to the schedule that defines a channel structure.

In Example 5, the subject matter of Example 4 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

In Example 6, the subject matter of any of Examples 1-5 can optionally include where the type of allocation is to be the SP with a 2.16 GHz bonded channel, 4.32 GHz bonded channel, or a 6.48 GHz bonded channel, or the CBAP with a 2.16 GHz bonded channel, 4.32 GHz bonded channel, or a 6.48 GHz bonded channel.

In Example 7, the subject matter of any of Examples 1-6 can optionally include where allocations of the one or more allocations on different channels overlapping in time are to have a same start time and a same end time.

In Example 8, the subject matter of any of Examples 1-7 can optionally include where the extended schedule element is to be transmitted in one from the following group: a beacon, a directional multi-gigabit (DMB) beacon, and an announce frame.

In Example 9, the subject matter of any of Examples 1-8 can optionally include where the one or more allocations comprise at most three allocations that overlap one another in time.

In Example 10, the subject matter of any of Examples 1-9 can optionally include where the duration of each allocation is at most as long as the duration of an allocation of the one or more allocations on a primary channel of the BSS or PBSS.

In Example 11, the subject matter of any of Examples 1-10 can optionally include where the wireless device and the one or more stations are each one from the following group: an Institute of Electrical and Electronic Engineers (IEEE) 802.11ay access point (AP), an IEEE 802.11ay personal basic service set control point (PCP), an AP, a PCP, an IEEE 802.11ay station, an IEEE 802.11ad AP, an IEEE 802.11ad PCP, and an IEEE 802.11ad station.

In Example 12, the subject matter of any of Examples 1-11 can optionally include where the processing circuitry is further configured to operate in accordance with Institute of Electrical and Electronic Engineers (IEEE) 802.11ay.

In Example 13, the subject matter of any of Examples 1-12 can optionally include where the apparatus further comprises one or more antennas coupled to the processing circuitry.

Example 14 is a non-transitory computer-readable storage medium that stores instructions for execution by one or more processors. The instructions to configure the one or more processors to cause a wireless device to: encode a schedule of one or more resource allocations, wherein each resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a basic service set (BSS) or a personal BSS (PBSS) primary channel, BSS or PBSS secondary channel, or BSS or PBSS tertiary channel; and cause to be transmitted the schedule to one or more stations identified by the source AID and the destination AID of the one or more resource allocations.

In Example 15, the subject matter of Example 14 can optionally include where if the one or more allocations is at least two allocations then a first allocation of the one or more allocations comprises the BSS or PBSS primary channel as the channel and a first source AID and a first destination AID wherein a station with the first source AID or the first destination AID is legacy station.

In Example 16, the subject matter of Examples 14 or 15 can optionally include where if the type is the SP and if the one or more allocations comprises at least two allocations, then the stations identified by the source AID and destination AID in different allocations are different from one another.

In Example 17, the subject matter of any of Examples 14-16 can optionally include where allocations of the one or more allocations on different channels overlapping in time are to have a same start time and a same end time.

In Example 18, the subject matter of any of Examples 14-17 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

Example 19 is a method performed by a wireless device, the method comprising: encoding a schedule of one or more resource allocations, wherein each resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a basic service set (BSS) or a personal BSS (PBSS) primary channel, BSS or PBSS secondary channel, or BSS or PBSS tertiary channel; and causing to be transmitted the schedule to one or more stations identified by the source AID and the destination AID of the one or more resource allocations.

In Example 20, the subject matter of Example 19 can optionally include where if the one or more allocations is at least two allocations then a first allocation of the one or more allocations comprises the BSS or PBSS primary channel as the channel and a first source AID and a first destination AID wherein a station with the first source AID or the first destination AID is legacy station.

Example 21 is an apparatus of a station (STA) comprising memory and processing circuitry coupled to the memory. The processing circuitry configured to: decode a basic service set (BSS) or a personal BSS (PBSS) channel allocation; decode a resource allocations, wherein the resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a BSS or a PBSS primary channel, BSS or PBSS secondary channel, or BSS or PBSS tertiary channel, wherein an AID of the station matches the source AID or the destination AID; and determine a channel to use based on the BSS or PBSS channel allocation and the channel.

In Example 22, the subject matter of Example 21 can optionally include where the processing circuitry is further configured to: cause to be transmitted a packet on the determined channel to use in accordance with the resource allocation.

In Example 23, the subject matter of Examples 21 or 22 can optionally include where the processing circuitry is further configured to operate in accordance with Institute of Electrical and Electronic Engineers (IEEE) 802.11ay.

In Example 24, the subject matter of any of Examples 21-23 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

In Example 25, the subject matter of any of Examples 21-24 can optionally include where the apparatus further comprises one or more antennas coupled to the processing circuitry.

Example 26 is an apparatus of a wireless device comprising: means for encoding a schedule of one or more resource allocations, wherein each resource allocation comprises a type of allocation, a bandwidth, an indication of a channel, a source association identification (AID), a destination AID, an allocation start, and a duration, wherein the type of allocation is one of a service period (SP) or a contention-based access period (CBAP), and wherein the channel is one of an indication of a basic service set (BSS) or a personal BSS (PBSS) primary channel, BSS or PBSS secondary channel, or BSS or PBSS tertiary channel; and means for configuring the device for transmission of the schedule to one or more stations identified by the source AID and the destination AID of the one or more resource allocations.

In Example 27, the subject matter of Example 26 can optionally include where if the one or more allocations is at least two allocations then a first allocation of the one or more allocations comprises the BSS or PBSS primary channel as the channel and a first source AID and a first destination AID wherein a station with the first source AID or the first destination AID is legacy station.

In Example 28, the subject matter of Examples 26 or 27 can optionally include where if the type is the SP and if the one or more allocations comprises at least two allocations, then the stations identified by the source AID and destination AID in different allocations are different from one another.

In Example 29, the subject matter of any of Examples 26-28 can optionally include where the BSS or PBSS primary channel, BSS or PBSS secondary channel and BSS or PBSS tertiary channel are to be defined by a packet transmitted prior to the schedule that defines a channel structure.

In Example 30, the subject matter of Example 29 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

In Example 31, the subject matter of any of Examples 26-30 can optionally include where the type of allocation is to be the SP with a 2.16 GHz bonded channel, 4.32 GHz bonded channel, or a 6.48 GHz bonded channel, or the CBAP with a 2.16 GHz bonded channel, 4.32 GHz bonded channel, or a 6.48 GHz bonded channel.

In Example 32, the subject matter of any of Examples 26-31 can optionally include where allocations of the one or more allocations on different channels overlapping in time are to have a same start time and a same end time.

In Example 33, the subject matter of any of Examples 26-32 can optionally include where the extended schedule element is to be transmitted in one from the following group: a beacon, a directional multi-gigabit (DMB) beacon, and an announce frame.

In Example 34, the subject matter of any of Examples 26-33 can optionally include where the one or more allocations comprise at most three allocations that overlap one another in time.

In Example 35, the subject matter of any of Examples 26-34 can optionally include where the duration of each allocation is at most as long as the duration of an allocation of the one or more allocations on a primary channel of the BSS or PBSS.

In Example 36, the subject matter of any of Examples 26-35 can optionally include where the wireless device and the one or more stations are each one from the following group: an Institute of Electrical and Electronic Engineers (IEEE) 802.11ay access point (AP), an IEEE 802.11ay personal basic service set control point (PCP), an AP, a PCP, an IEEE 802.11ay station, an IEEE 802.11ad AP, an IEEE 802.11ad PCP, and an IEEE 802.11ad station.

In Example 37, the subject matter of any of Examples 26-36 can optionally include means for operating in accordance with Institute of Electrical and Electronic Engineers (IEEE) 802.11ay.

In Example 38, the subject matter of any of Examples 26-37 can optionally include where the apparatus further comprises means for transmitting and receiving radio signals.

Example 39 is an apparatus of a station (STA) comprising: means for decoding a basic service set (BSS) or a personal BSS (PBSS) channel allocation; means for decoding a resource allocations, wherein the resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a BSS or a PBSS primary channel, BSS or PBSS secondary channel, or BSS or PBSS tertiary channel, wherein an AID of the station matches the source AID or the destination AID; and means for determining a channel to use based on the BSS or PBSS channel allocation and the channel.

In Example 40, the subject matter of Example 39 can optionally include means for causing to be transmitted a packet on the determined channel to use in accordance with the resource allocation.

In Example 41, the subject matter of Examples 39 or 40 can optionally include means for operating in accordance with Institute of Electrical and Electronic Engineers (IEEE) 802.11ay.

In Example 42, the subject matter of any of Examples 39-41 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

In Example 43, the subject matter of any of Examples 39-42 can optionally include means for transmitting and receiving radio signals.

Example 44 is a non-transitory computer-readable storage medium that stores instructions for execution by one or more processors, the instructions to configure the one or more processors to cause a wireless device to: decode a basic service set (BSS) or a personal BSS (PBSS) channel allocation; decode a resource allocations, wherein the resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a BSS or a PBSS primary channel, BSS or PBSS secondary channel, or BSS or PBSS tertiary channel, wherein an AID of the station matches the source AID or the destination AID; and determine a channel to use based on the BSS or PBSS channel allocation and the channel.

In Example 45, the subject matter of Example 44 can optionally include where the instructions further configure the one or more processors to cause the wireless device to: cause to be transmitted a packet on the determined channel to use in accordance with the resource allocation.

In Example 46, the subject matter of Examples 44 or 45 can optionally include where the processing circuitry is further configured to operate in accordance with Institute of Electrical and Electronic Engineers (IEEE) 802.11ay.

In Example 47, the subject matter of any of Examples 44-46 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

Example 48 is a method performed by a wireless device, the method comprising: decoding a basic service set (BSS) or a personal BSS (PBSS) channel allocation; decoding a resource allocations, wherein the resource allocation comprises a type of allocation, a bandwidth, an indication of a channel, a source association identification (AID), a destination AID, an allocation start, and a duration, wherein the type of allocation is to be a service period (SP) or a contention-based access period (CBAP), and wherein the channel is to be an indication of a BSS or a PBSS primary channel, BSS or PBSS secondary channel, or BSS or PBSS tertiary channel, wherein an AID of the station matches the source AID or the destination AID; and determining a channel to use based on the BSS or PBSS channel allocation and the channel.

In Example 49, the subject matter of Example 48 can optionally include causing to be transmitted a packet on the determined channel to use in accordance with the resource allocation.

In Example 50, the subject matter of Examples 48 or 49 can optionally include operating in accordance with Institute of Electrical and Electronic Engineers (IEEE) 802.11ay.

In Example 51, the subject matter of any of Examples 48-50 can optionally include where the channel structure is one from the following group: a 2.16 GHz BSS or PBSS primary channel, a 2.16 GHz BSS or PBSS secondary channel, and a 2.16 GHz BSS or PBSS tertiary channel; a 4.32 GHz BSS or PBSS primary channel and a 2.16 GHz BSS or PBSS tertiary channel; a 2.16 GHz BSS or PBSS primary channel and a 4.32 GHz BSS or PBSS secondary channel; and, a 6.48 GHz BSS or PBSS primary channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) or Personal Basic Service Set (PBSS) control point (PCP), the apparatus comprising: memory and processing circuitry configured to:
   encode an extended schedule element, the extended schedule element comprising channel allocation fields, the channel allocation fields indicating channels for allocations,
   the channel allocation fields comprising allocation start subfields, allocation duration subfields, source association identification (AID) subfields, destination AID subfields, allocation type subfields, and bandwidth (BW) subfields,
   wherein the allocation start subfields indicate start times for the allocations,
   wherein the allocation duration subfields indicate durations, in microseconds, of the allocations,
   wherein the allocation type subfields indicate whether a channel access mechanism is a service period (SP) or a contention-based access period (CBAP) for the allocations,
   wherein the BW subfields comprise bits to indicate which 2.16 GHz channels are allocated for the allocations, wherein the source AID fields comprise AIDS of stations (STAs) that are to initiate channel access during the allocations, wherein the destination AID fields comprise AIDS of STAs that are to be targeted by the STAs identified by the source AID fields, and wherein when the channel access mechanism is SP and when the channel allocation fields indicate at least two allocations that overlap in time and indicate different 2.16 GHz channels, the source AID fields of the at least two allocations are different from one another and the destination AID fields of the at least two allocations are different from one another; and generate signaling to cause the AP or PCP to transmit the extended schedule element to the STAs indicated by the source ID fields and the destination ID fields.

2. The apparatus of claim 1, wherein the channel allocation fields further comprise indications of whether the 2.16 GHz channels indicated by the BW subfields are aggregated.

3. The apparatus of claim 1, wherein the processing circuitry is further configured to:

encode an announce frame or a directional beacon frame to comprise the extended schedule element, and generate signaling to cause the AP or PCP to transmit the announce frame or the directional beacon frame comprising the extended schedule element to the STAs indicated by the source ID fields and the destination ID fields.

4. The apparatus of claim 1, wherein the extended schedule element further comprises:

an element ID subfield and a length subfield, wherein the element ID subfield indicates an ID for the extended schedule element.

5. The apparatus of claim 1, wherein the channel allocation fields further comprise beam forming (BF) subfields and allocation ID subfields, wherein the BF subfields indicate information for BF and the allocation ID subfields indicate a unique ID for a corresponding allocation of the allocations.

6. The apparatus of claim 1, wherein one of the at least two allocations that overlap in time and indicate different 2.16 GHz channels indicates a primary 2.16 GHz channel.

7. The apparatus of claim 1, wherein the source AID fields and the destination AID fields comprise at most one indication of the AP or PCP.

8. The apparatus of claim 1, wherein if the source AID fields or the destination AID fields indicate the AP or PCP, a corresponding BW subfield of the BW subfields indicates a 2.16 GHz primary channel.

9. The apparatus of claim 1, wherein there are three or more 2.16 GHz channels.

10. The apparatus of claim 1, wherein the extended schedule element is an extended directional multi-gigabit (EDMG) extended schedule element.

11. The apparatus of claim 1, wherein the extended schedule element is to be transmitted in one from the following group: a beacon, a directional multi-gigabit (DMB) beacon, a grant frame, and an announce frame.

12. The apparatus of claim 1, wherein the processing circuitry is further configured to operate in accordance with Institute of Electrical and Electronic Engineers (IEEE) 802.11ay.

13. The apparatus of claim 1, wherein the apparatus further comprises transceiver circuitry coupled to the processing circuitry; and one or more antennas coupled to the transceiver circuitry.

14. A non-transitory computer-readable storage medium that stores instructions for execution by one or more processors of an access point (AP) or Personal Basic Service Set (PBSS) control point (PCP), the instructions to configure the one or more processors to:

encode an extended schedule element, the extended schedule element comprising channel allocation fields, the channel allocation fields indicating channels for allocations, the channel allocation fields comprising allocation start subfields, allocation duration subfields, source association identification (AID) subfields, destination AID subfields, allocation type subfields, and bandwidth (BW) subfields, wherein the allocation start subfields indicate start times for the allocations, wherein the allocation duration subfields indicate durations, in microseconds, of the allocations, wherein the allocation type subfields indicate whether a channel access mechanism is a service period (SP) or a contention-based access period (CBAP) for the allocations, wherein the BW subfields comprise bits to indicate which 2.16 GHz channels are allocated for the allocations, wherein the source AID fields comprise AIDS of stations (STAs) that are to initiate channel access during the allocations, wherein the destination AID fields comprise AIDS of STAs that are to be targeted by the STAs identified by the source AID fields, and wherein when the channel access mechanism is SP and when the channel allocation fields indicate at least two allocations that overlap in time and indicate different 2.16 GHz channels, the source AID fields of the at least two allocations are different from one another and the destination AID fields of the at least two allocations are different from one another; and generate signaling to cause the AP or PCP to transmit the extended schedule element to the STAs indicated by the source ID fields and the destination ID fields.

15. The non-transitory computer-readable storage medium of claim 14, wherein the channel allocation fields further comprise indications of whether the 2.16 GHz channels indicated by the BW subfields are aggregated.

16. The non-transitory computer-readable storage medium of claim 14, wherein the instructions further configure the one or more processors to:

encode an announce frame or a directional beacon frame to comprise the extended schedule element; and generate signaling to cause the AP or PCP to transmit the announce frame or the directional beacon frame comprising the extended schedule element to the STAs indicated by the source ID fields and the destination ID fields.

17. A method performed by an apparatus of an access point (AP) or Personal Basic Service Set (PBSS) control point (PCP), the method comprising:

encoding an extended schedule element, the extended schedule element comprising channel allocation fields, the channel allocation fields indicating channels for allocations, the channel allocation fields comprising allocation start subfields, allocation duration subfields, source association identification (AID) subfields, destination AID subfields, allocation type subfields, and bandwidth (BW) subfields, wherein the allocation start subfields indicate start times for the allocations, wherein the allocation duration subfields indicate durations, in microseconds, of the allocations, wherein the allocation type subfields indicate whether a channel access mechanism is a service period (SP) or a contention-based access period (CBAP) for the allocations, wherein the BW subfields comprise bits to indicate which 2.16 GHz channels are allocated for the allocations, wherein the source AID fields comprise AIDS of stations (STAs) that are to initiate channel access during the allocations, wherein the destination AID fields comprise AIDS of STAs that are to be targeted by the STAs identified by the source AID fields, and wherein when the channel access mechanism is SP and when the channel allocation fields indicate at least two allocations that overlap in time and indicate different 2.16 GHz channels, the source AID fields of the at least two allocations are different from one another and the destination AID fields of the at least two allocations are different from one another; and generating signaling to cause the AP or PCP to transmit the extended schedule element to the STAs indicated by the source ID fields and the destination ID fields.

18. The method of claim 14, wherein the channel allocation fields further comprise indications of whether the 2.16 GHz channels indicated by the BW subfields are aggregated.

19. An apparatus of a station (STA), the apparatus comprising: memory and processing circuitry configured to:

decode an extended schedule element, the extended schedule element comprising channel allocation fields, the channel allocation fields indicating channels for allocations, the channel allocation fields comprising allocation start subfields, allocation duration subfields, source association identification (AID) subfields, destination AID subfields, allocation type subfields, bandwidth (BW) subfields, and an indication of whether the 2.16 GHz channels indicated in the BW subfields are aggregated, wherein the allocation start subfields indicate start times for the allocations, wherein the allocation duration subfields indicate durations, in microseconds, of the allocations, wherein the allocation type subfields indicate whether a channel access mechanism of the allocation is a service period (SP) or a contention-based access period (CBAP), wherein the BW subfields comprise bits to indicate which 2.16 GHz channels are allocated for the allocation, wherein the source ID fields indicate association identifications (AIDs) of stations (STAs) that are to initiate channel access during the allocation, wherein the destination ID fields indicate AIDS of STAs that are to be targeted by the STAs indicated by the source ID fields, and wherein the channel allocation fields indicate at least two channel allocations that overlap in time and indicate different 2.16 GHz channels, and wherein the source AID fields of the at least two allocations are different from one another and the destination AID fields of the at least two allocations are different from one another.

20. The apparatus of claim 19, wherein the extended schedule element is received from an access point (AP) or Personal Basic Service Set (PBSS) control point (PCP).

21. The apparatus of claim 19, wherein the processing circuitry is further configured to operate in accordance with Institute of Electrical and Electronic Engineers (IEEE) 802.11ay.

22. The apparatus of claim 19, wherein the apparatus further comprises transceiver circuitry coupled to the processing circuitry; and one or more antennas coupled to the transceiver circuitry.

* * * * *